Oct. 11, 1938.                H. J. HORN                2,133,142
                             VEHICLE WHEEL
                          Filed Jan. 6, 1936
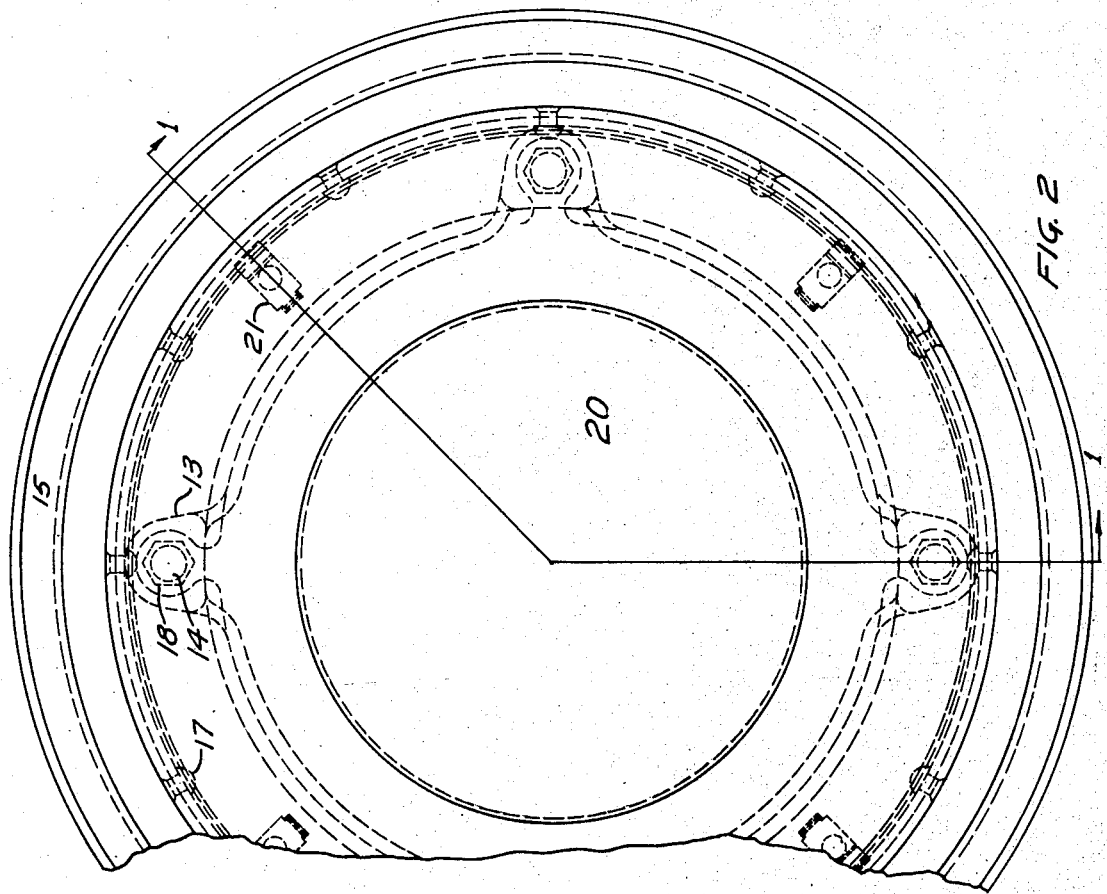
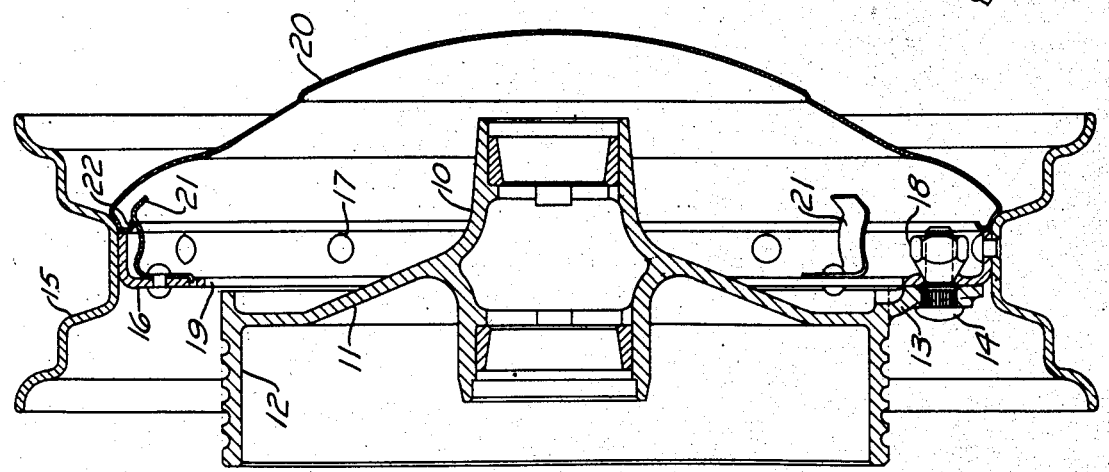
INVENTOR.
HARRY J. HORN
BY
Carroll R. Taber
ATTORNEY.

Patented Oct. 11, 1938

2,133,142

UNITED STATES PATENT OFFICE 2,133,142

VEHICLE WHEEL

Harry J. Horn, Lansing, Mich., assignor to Motor Wheel Corporation, Lansing, Mich., a corporation of Michigan Application January 6, 1936, Serial No. 57,654

3 Claims. (Cl. 301—37)

This invention relates to vehicle wheels and more particularly to the provision of an article of manufacture for assembly in vehicle wheels comprising a one piece integral hub, disk, brake ring and spoke construction, and the combination of such construction with a rim and a felly ring permanently attached thereto to form a complete wheel assembly.

The preferred embodiment of the invention is illustrated in the accompanying drawing, wherein:

Fig. 1 is a sectional view through a vehicle wheel taken on substantially the line 1—1 of Fig. 2, and Fig. 2 is a front view in elevation of the wheel construction shown in Fig. 1.

According to the present invention, the hub 10, the radially extending disk or brake drum web 11, the cylindrically extending ring 12 and the radially extending projections 13 are all formed as an integral one piece construction. Preferably these parts are formed as a casting but it is contemplated that they may also be formed as a forging.

The hub 10 is of course adapted to be mounted upon a wheel axle. The radially extending disk 11 serves not only to support the brake rim 12 but also, as will now be described, constitutes the sole means for transmitting the wheel load between the rim and the hub.

As best shown in Fig. 2, the integral hub and drum construction includes four circumferentially spaced radially extending spoke projections 13 provided with openings adjacent their outer extremities for the reception of stud bolts 14. A rim 15 is mounted upon the projections 13 through means of the annular felly ring 16, one leg of which is permanently attached to the rim as by rivets 17 and the other leg of which extends radially inwardly of the rim. The latter is provided with openings adapted to receive the free extremities of stud bolts 14. After the rim has been mounted upon the projections 13 by locating the felly ring with the stud bolts 14 extending through the openings therein, it is secured in this position by means of nuts 18 adapted to be threaded onto the outer extremities of the bolts 14.

It will be observed that the felly ring 16 is secured to the projections 13 in such manner as to locate the inner periphery of the felly ring radially outwardly of the cylindrical brake ring 12. There is thus formed, as indicated at 19, an annular space between the outer surface of ring 12 at the periphery of disk 11 and the felly ring 16, interrupted only by the radial projections 13. The provision of this space between the felly ring 16 and the ring portion 12 of the brake drum permits the free circulation of air around the exterior of the hub 10, the disk or web 11 and the ring portion 12 of the brake drum to facilitate dissipation of heat therefrom.

While the construction thus far described is very sturdy and very economical to manufacture, it is not particularly pleasing in appearance. To enhance the appearance of the wheel, an ornamental cover 20 is preferably detachably connected thereto in spaced concealing relation to the hub and brake drum. Preferably, this attachment is through the medium of a plurality of spring clips 21 permanently connected to the felly ring 16 intermediate the openings provided therein for the reception of stud bolts 14. The spring clips 21 are adapted to resiliently engage the cooperating peripheral flanged portion 22 of cover 20. In order to hold the cover firmly in position upon the wheel, it is preferably formed at its periphery to contact the base of the rim 15 when installed, as shown in Fig. 1.

From the foregoing description, it will be apparent that this invention provides a simple and sturdy wheel construction that is especially economical to manufacture by reason of the elimination of the necessity for assembling a large number of separate parts to form the complete wheel. It will also be apparent that adequate provision is made for the dissipation of heat generated in the brake drum. While only the preferred embodiment has been shown and described, it should be understood that the invention is not limited thereto but is co-extensive with the scope of the appended claims.

I claim:
1. A wheel including, in combination, a wheel body, a rim, a radially extending felly ring secured to the rim, means associated with the felly ring for demountably securing the rim to the wheel body, a cover having a peripheral portion abutting said felly ring and arranged to conceal the wheel body and said securing means, and a plurality of resilient attaching clips rigidly secured to the felly ring and resiliently engaging the cover adjacent its periphery to detachably connect the cover to the wheel.

2. In a vehicle wheel, the combination with a rim having a relatively narrow radially extending felly ring permanently secured thereto of means associated with the felly ring for demountably attaching the rim to a wheel body, an imperforate cover having a peripheral portion engaging the rim and another peripheral portion abutting said felly ring, said cover being arranged to conceal said attaching means, and a plurality of axially extending resilient attaching clips carried by said felly ring and arranged to detachably engage the cover adjacent its periphery.

3. In a vehicle wheel, the combination with a rim having a radially extending felly ring permanently secured thereto of a plurality of axially extending resilient attaching clips rigidly connected to the felly ring and an ornamental cover arranged to conceal the felly ring and said attaching clips and having peripheral portions adapted to be pressed axially into engagement with said attaching clips and into abutment with said felly ring and a base portion of said rim.

HARRY J. HORN.